United States Patent
Stern et al.

(10) Patent No.: US 6,597,328 B1
(45) Date of Patent: Jul. 22, 2003

(54) METHOD FOR PROVIDING PRIVATELY VIEWABLE DATA IN A PUBLICALLY VIEWABLE DISPLAY

(75) Inventors: Edith H. Stern, Boca Raton, FL (US); Barry E. Willner, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 461 days.

(21) Appl. No.: 09/640,121

(22) Filed: Aug. 16, 2000

(51) Int. Cl.[7] .................................................. G09G 5/00
(52) U.S. Cl. ............................ 345/9; 359/501; 359/483
(58) Field of Search ............................... 345/629, 4, 5, 345/7–9, 2.1, 102, 99; 359/443, 483, 489, 501, 454, 464, 465

(56) References Cited

U.S. PATENT DOCUMENTS

| | | | |
|---|---|---|---|
| 4,859,994 A | * 8/1989 | Zola et al. | 345/9 |
| 5,488,496 A | * 1/1996 | Pine | 349/96 |
| 5,712,731 A | * 1/1998 | Drinkwater et al. | 359/619 |
| 5,825,436 A | * 10/1998 | Knight | 349/16 |
| 5,963,371 A | * 10/1999 | Needham et al. | 359/464 |
| 6,262,843 B1 | * 7/2001 | Marx | 359/501 |
| 6,504,649 B1 | * 1/2003 | Myers | 359/454 |

OTHER PUBLICATIONS

Lenny Lipton, *Stereo–Vision Formats for Video and Computer Graphics,* Stereo-Graphics Corporation (1996–1997).
Lenny Lipton, Jeff Halnon, *Interfacing Shuttering–Type Stereoscopic Hardware with Windows/NT Workstations,* Stereographics Corporation (1998).
Michael Starks, *Stereoscopic Imaging Technology,* Stereographics Corporation.
*Stereo3D™ Hardware Developer's Handbook,* Stereographics Corporation (1999).

* cited by examiner

*Primary Examiner*—Kent Chang
(74) *Attorney, Agent, or Firm*—Akerman Senterfitt

(57) ABSTRACT

A method for providing privately viewable data in a publically viewable display includes the steps of: positioning obscuring lights proximate to the publicly viewable display; generating a sequencing pattern; generating a data signal, the data signal comprising private data frames; providing the data signal to the publicly viewable display; activating and deactivating obscuring lights according to the sequencing pattern; and, opening and closing a shuttered display in a set of active glasses in accordance with the sequencing pattern. In consequence, a user viewing the display with the active glasses can view the private data while unauthorized viewers without the active glasses can view only the private data obscured by the obscuring lights.

38 Claims, 5 Drawing Sheets

INITIAL SYNCHRONIZATION PATTERN

SYNCHRONIZATION TRANSMISSION PATTERN

METHOD FOR PROVIDING PRIVATELY VIEWABLE DATA IN A PUBLICALLY VIEWABLE DISPLAY

BACKGROUND OF THE INVENTION

1. Technical Field

This invention relates to the field of computer imagery and more particularly to a system and method for providing privately viewable data in a publically viewable display.

2. Description of the Related Art

The laptop computer has become a ubiquitous part of current computer technology. Laptops by their nature are used on trains, in airplanes, and in most public places. Still, portable computing carries with it a substantial disadvantage. Specifically, in a crowded environment, what is visible on the display screen of a laptop remains visible to all within viewing distance of the display screen. Thus, from the perspective of the laptop user, a potential security concern exists which can undermine the usefulness of the laptop. Exemplary cases include the use of laptop computers on airplanes where the seating and tray table arrangements are so close that the adjacent passengers can easily view one another's laptop screens. A similar situation exists in airport lounges, waiting rooms, etc.

Similar non-laptop security and privacy issues can arise in other environments. For example, in a high security environment, desktop machines are typically housed in separate rooms or cubicles to prevent adjacent workers from viewing each others screens. Additionally, Automatic Teller Machines (ATMs) are readily available, but almost always ATMs are placed in conspicuous locations for ease of use. The conspicuous nature of the chosen public location can contribute to the ease of observation, which can permit an unauthorized viewer to obtain an ATM user's confidential information as the user inserts their ATM card into the ATM and subsequently keys in a Personal Identification Number (PIN). Hence, it would be advantageous if a user could be provided with a private view of a publically viewable display screen while unauthorized viewers are provided with a different, public view of the same display screen.

Presently, techniques exist for rendering different images on a single display screen. Three-dimensional (3D) imaging represents the most well known example. 3D imaging involves presenting different images to each eye, allowing the human vision system to integrate each into one composite image. 3D imaging techniques can be implemented using various technologies, such as color filters or shutters. The display screen can include different images presented in an alternating fashion. The viewers eyes, using the visual persistence of the retina and the visual cortex, can integrate the alternating images into a unified image.

In recent years, "active glasses" have been used to accomplish 3D imaging. Heretofore, active glasses have been implemented in large, bulky and expensive specialized headgear. Active glasses have also been integrated into specialized helmets, for example military helmets. The former typically block all vision except for what can be projected on built-in displays. The latter permits "see through" normal vision with an overlay of information, typically referred to as "heads-up" displays. As an alternative, polarizing means, for example polarized glasses, have been utilized such that a projection screen is illuminated with light of alternating polarity so that each eye sees only one half of the projected frames, wherein each frame is offset to produce the 3D image.

SUMMARY OF THE INVENTION

With active glasses, multiple visuals can be perceived using imagery momentarily viewable between bursts of obscuring light. Active glasses can be combined with a display controller for controlling the rate of activating and deactivating the obscuring light. The presentation through the active glasses of private imagery between bursts of obscuring light can be programmed to match a sequencing rate used to sequentially activate and deactivate the bursts of obscuring light in between which the private imagery can be viewed in the display screen. Using the sequencing rate, which can be provided to an authorized viewer, but not an unauthorized viewer, unauthorized viewers can be prevented from perceiving the private imagery because without active glasses programmed to the sequencing rate, an unauthorized viewer cannot visually extract the private imagery from among the bursts of obscuring light.

In general, the invention described herein permits only those authorized viewers of an image to decipher a private image on a display while unauthorized users can view merely obscuring light. In furtherance of this purpose, imaging techniques including data hiding can be combined with a wearable device, for example active glasses, which can be synchronized with obscuring lights positioned about the display. The known capability of the human vision system to fuse multiple images into a single image completes the ability to provide privately viewable data in a publically viewable display So that unauthorized users are precluded from viewing private data obscured by light emanating forth from the obscuring lights while authorized viewers using the active glasses can view the private data despite the obscuring lights.

A method for providing privately viewable data in a publically viewable display comprises the steps of: positioning obscuring lights proximate to the publicly viewable display; generating a sequencing pattern; generating a data signal, the data signal comprising private data frames; providing the data signal to the publicly viewable display; activating and deactivating obscuring lights according to the sequencing pattern; and, opening and closing a shuttered display in a set of active glasses in accordance with the sequencing pattern. In consequence, a user viewing the display with the active glasses can view the private data while unauthorized viewers without the active glasses can view only the private data obscured by the obscuring lights.

The sequencing pattern can correspond to alternating displays of the private data and the private data masked by the obscuring lights. Preferably, the obscuring lights can be strobe lights positioned about the publicly viewable display. Alternatively, the strobe lights can be fiber optic light pipes positioned in the publicly viewable display. Notably, the publicly viewable display can be a laptop computer display panel. Also, the publicly viewable display can be an ATM display screen.

The step of activating and deactivating the obscuring lights comprises the steps of: activating the obscuring lights; and, responsive to sync pulses in the sequencing pattern, deactivating and reactivating the obscuring lights. Similarly, the step of opening and closing the shuttered display can include the steps of: closing the shuttered display; and, responsive to sync pulses in the sequencing pattern, opening and closing the shuttered display. In the preferred embodiment, the sequencing pattern can be encoded. Where the sequencing pattern has been encoded, the step of opening and closing the shuttered display can include the steps of: decoding the encoded sequencing pattern; and, responsive to sync pulses in the sequencing pattern, opening and closing the shuttered display.

In an alternative embodiment, where data security is particularly important, the generated data signal can further include public data frames interspersed among the data frames in accordance with said sequencing pattern. As such the private data can be displayed when the shuttered display of the active glasses is open and the obscuring lights are deactivated. In contrast, the public data can be displayed when the shuttered display of the active glasses is closed and the obscuring lights are activated. Notably, the private data frames can include sets of private data portions. The portions can be combined to form the private data. As a result, the portions can be displayed sequentially according to the sequencing pattern.

Notably, the shuttered display can include shutters which can be opened and closed. Accordingly, the step of opening and closing the shuttered display can include the step of opening and closing shutters in the shuttered display. Alternatively, the shuttered display can include polarizing lenses. In the case of polarizing lenses, the step of opening and closing the shuttered display comprises the step of polarizing and depolarizing lenses in the shuttered display.

A system for providing privately viewable data in a publicly viewable display can include a computer comprising a display, a display driver, and at least one applications program; a display obscuring system comprising an encoder and obscuring lights positioned proximate to the publicly viewable display; an encoder algorithm disposed in the encoder for generating a sequencing pattern for driving the obscuring lights; a pair of active glasses having a shuttered display; and, a data communications link communicatively linking the display obscuring system with the active glasses.

Preferably, the applications program can provide private data in a data signal to the display driver. The display driver can provide the data signal to the publically viewable display. Significantly, the display obscuring system can activate and deactivate the obscuring lights according to the sequencing pattern. The active glasses can receive the sequencing pattern across the data communications link and open and close the shuttered display in accordance with the sequencing pattern. In consequence, a user viewing the display with the active glasses can view the private data generated by the application, and unauthorized viewers without the active glasses can view only the private data masked by the obscuring lights.

Preferably, the data communications link is a wireless data communications link, although the invention is not limited to a wireless data communications link and can be equally as effective using a wire-connected data communications link. The active glasses also can include a decoder for decoding the sequencing pattern. As a result, the decoder can decode the sequencing pattern; and, responsive to sync pulses in the sequencing pattern, the decoder can open and close the shuttered display. Similarly, the computer can activate and deactivate the obscuring lights when indicated by sync pulses in the sequencing pattern.

The sequencing pattern can correspond to alternating displays of the private data and the private data masked by the obscuring lights. In an alternative embodiment, where data privacy is of particular concern, the data signal can further include masking data interspersed among the private data according to the sequencing pattern. Moreover, the sequencing pattern can correspond to alternating displays of the private data and the private data masked by the masking data and the obscuring lights.

Notably, the obscuring lights can include fiber optic light pipes positioned in the display. Alternatively, the obscuring lights can include strobe lights positioned circumferentially about the display. In consequence of the inventive method, each authorized viewer viewing the display with corresponding active glasses can view the corresponding series of private data and unauthorized viewers without active glasses can view only the private data obscured by the obscuring lights.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
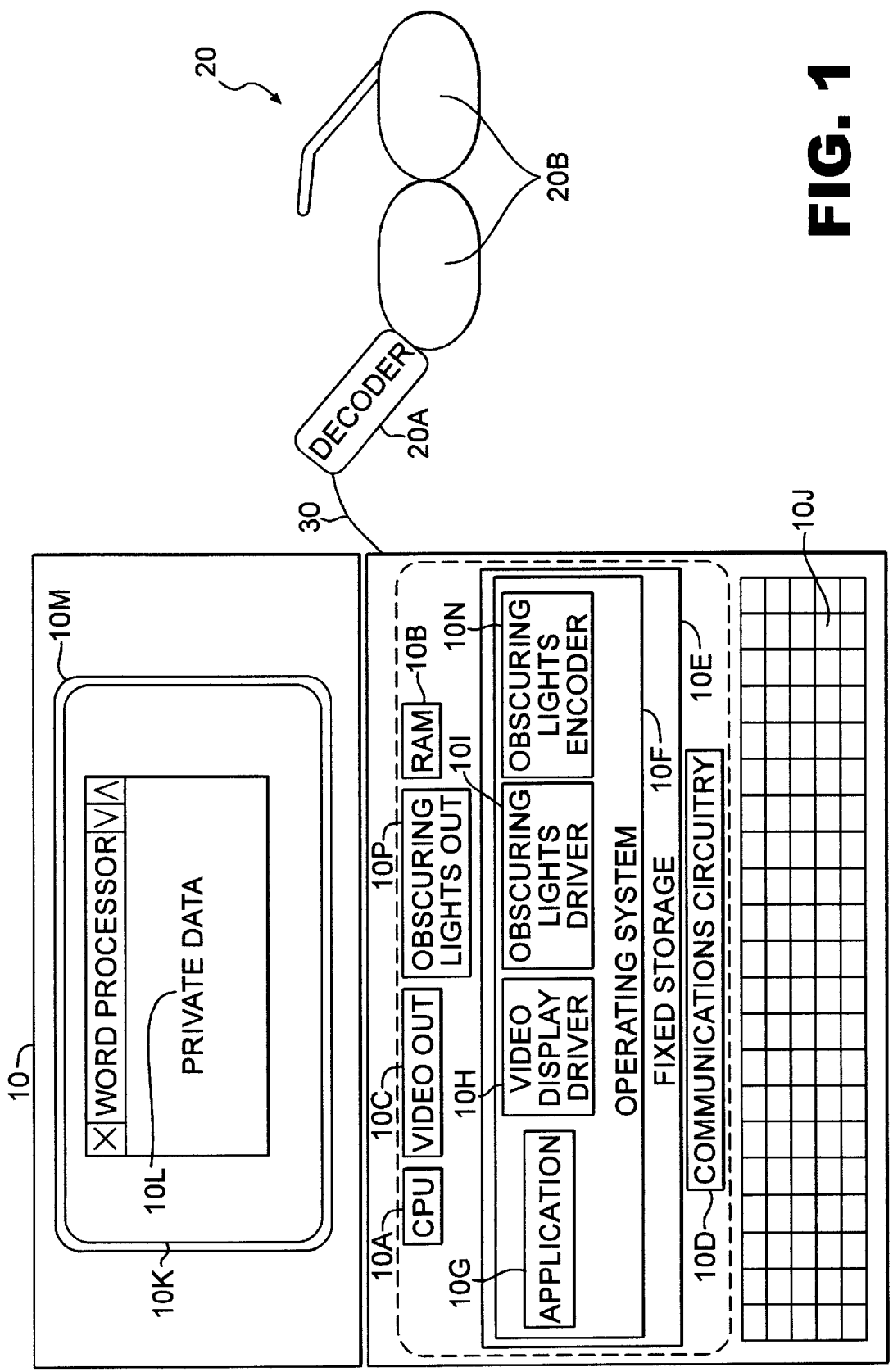
FIG. 1 is a diagramatic illustration of a laptop computer and a pair of active glasses, configured for use with the present invention.
Figure 2:
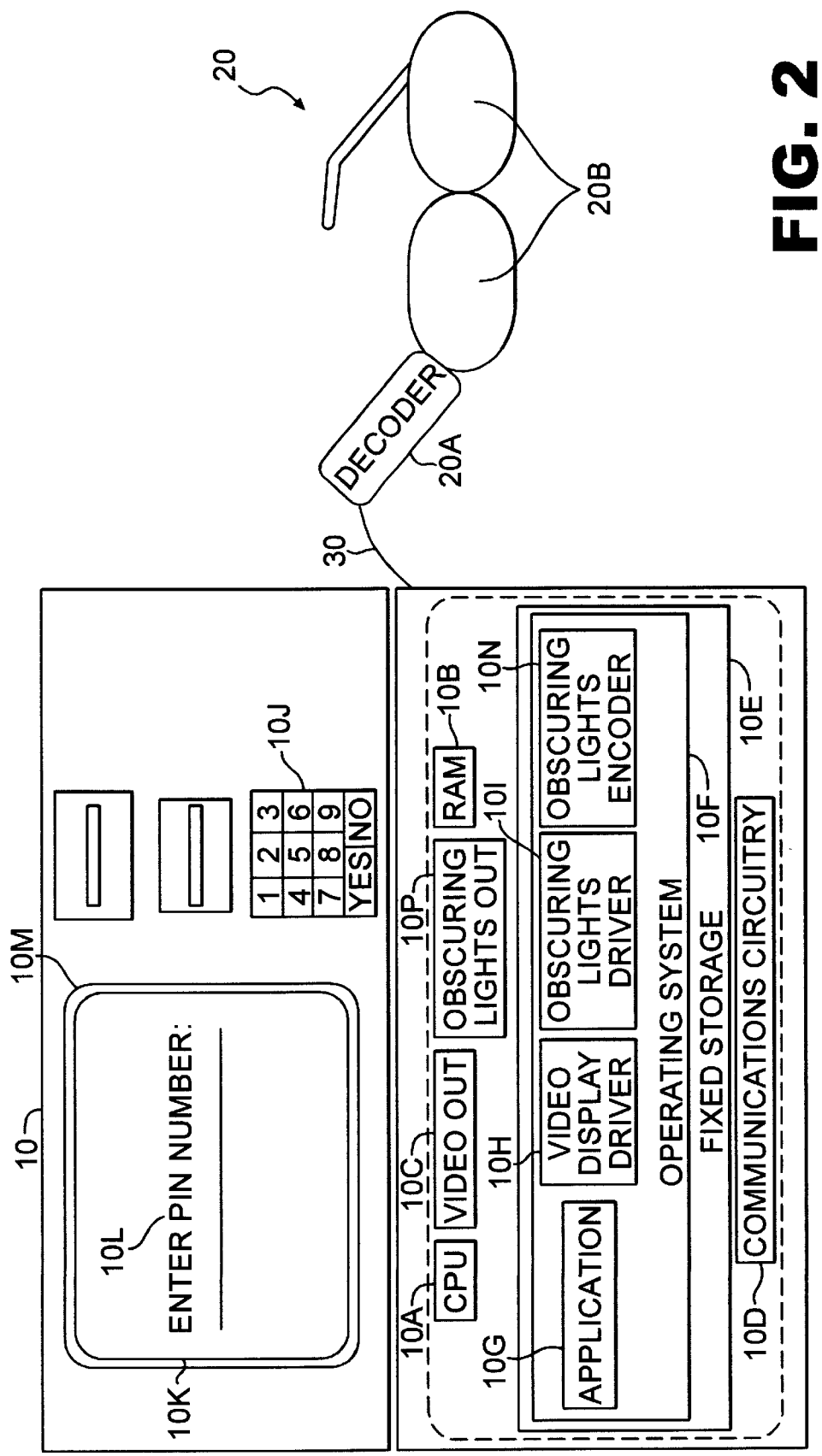
FIG. 2 is a diagramatic illustration of an Automatic Teller Machine ("ATM") and a pair of active glasses, configured for use with the present invention.

The present invention, described herein, includes a system, method, and apparatus that taken together, provide a personal, private view of publically viewable data using visual data hiding. A basic system, in accordance with the inventive arrangements, can include a set of active glasses, a computer having a publicly viewable display, obscuring lights positioned about the display, a data communications link from the active glasses to a computer, and encoding software contained within the computer for synchronizing. FIG. 1 is a high level diagram of a laptop computer in accordance with the inventive arrangements. FIG. 2 is a high level diagram of a kiosk, for example an ATM machine, in accordance with the inventive arrangements. Notably, the invention is directed towards any computing device, be it a laptop computer or kiosk, inasmuch as the computing device has a display which can be publicly viewed by unauthorized observers. Accordingly, the foregoing description of a computing device in accordance with the inventive arrangements can be made by reference to either FIG. 1 or FIG. 2.

A system in accordance with the inventive arrangements, whether the system is incorporated in a laptop computer as in FIG. 1, or in a public kiosk as in FIG. 2, can include a computer 10 having a display 10K in which private data 10L from an application 10G can be displayed, a set of active glasses 20 having therein a decoder 20A, a shuttered display 20B, and a communications link 30 connecting the computer 10 to the active glasses 20. Although the figure indicates a wire-based communications link, the invention is not limited in this regard. Rather, communications link 30 can include wireless solutions as well, for example an RF or infrared link.

The computer 10 can further include therein stored in a CPU 10A, a computer readable memory 10B, video circuitry 10C and a video display driver 10H for providing a video data signal generated in the application 10G to the video display 10K, and an input device 10J, for example a keyboard or numeric keypad. The computer 10 optionally can include data communications circuitry 10D. Finally, the computer 10 preferably has fixed storage 10E, for example a hard disk drive ("HDD") in which an operating system 10F, application program 10G and corresponding data can be stored. Additionally, the fixed storage 10E can store therein an operating system 10F upon which the application 10G can execute.

Significantly, the computer 10 can include obscuring lights 10M positioned about the display 10K. Preferably, the obscuring lights 10M are strobe lights. When activated, the strobe lights can stimulate the retina of a human eye associated with an unauthorized viewer. Persistent cycling of the strobe lights can prevent the human eye from perceiving the private data 10L which is proximate to the strobe lights. However, the invention is not limited in this regard. Rather, any suitable obscuring light fixture can suffice, for example fiber optic light pipes can be positioned in the display 10K. While the use of fiber optic light pipes in a display screen may not affect the human eye so as to prevent a viewer's perception of data on the display screen 10K, the fiber optic light pipes can directly obscure the private data 10L in the display screen 10K by bleeding light into the display pixels which, when illuminated, can form the visual basis for displaying the private data 10L.

The obscuring lights 10M can be activated and deactivated through an obscuring lights driver 101. The obscuring lights driver 101 can provide the interface between the obscuring lights 10M and the computer 10. An obscuring lights encoder 10N can compute and command a sequencing pattern by which the obscuring lights 10M can be activated and deactivated. Additionally, the obscuring lights encoder 10N can provide the sequencing pattern both to the obscuring lights 10M and the active glasses 20 through the obscuring lights output 10P. The active glasses 20 can receive the sequencing pattern in the decoder 20A and, based thereon, can determine when to open and close the shuttered display 20B. In this way, the shuttered display 20B of the active glasses 20 can be opened and closed synchronously with the deactivation and activation of the obscuring lights 10M.

Notably, although shown as an integrated portion of computer 10, the obscuring lights output port 10P, obscuring lights device driver 101 and obscuring lights encoder 10N need not be included as part of the computer 10. Rather, a separate obscuring lights system can be positioned proximate to the display 10K of the computer 10 so as to effectively provide a private viewing of private data in a publicly viewable display in accordance with the inventive arrangements without modifying the computer 10. For example, the obscuring lights system can be implemented as an attachment to the exterior shell of the display 10K. An example usage of a separate obscuring lights system can include a system for attachment to a laptop display panel when private viewing is necessary. A separate attachment to a laptop display panel could be particularly useful when a laptop is used in a public place, for example an airplane or train.

Figure 3:
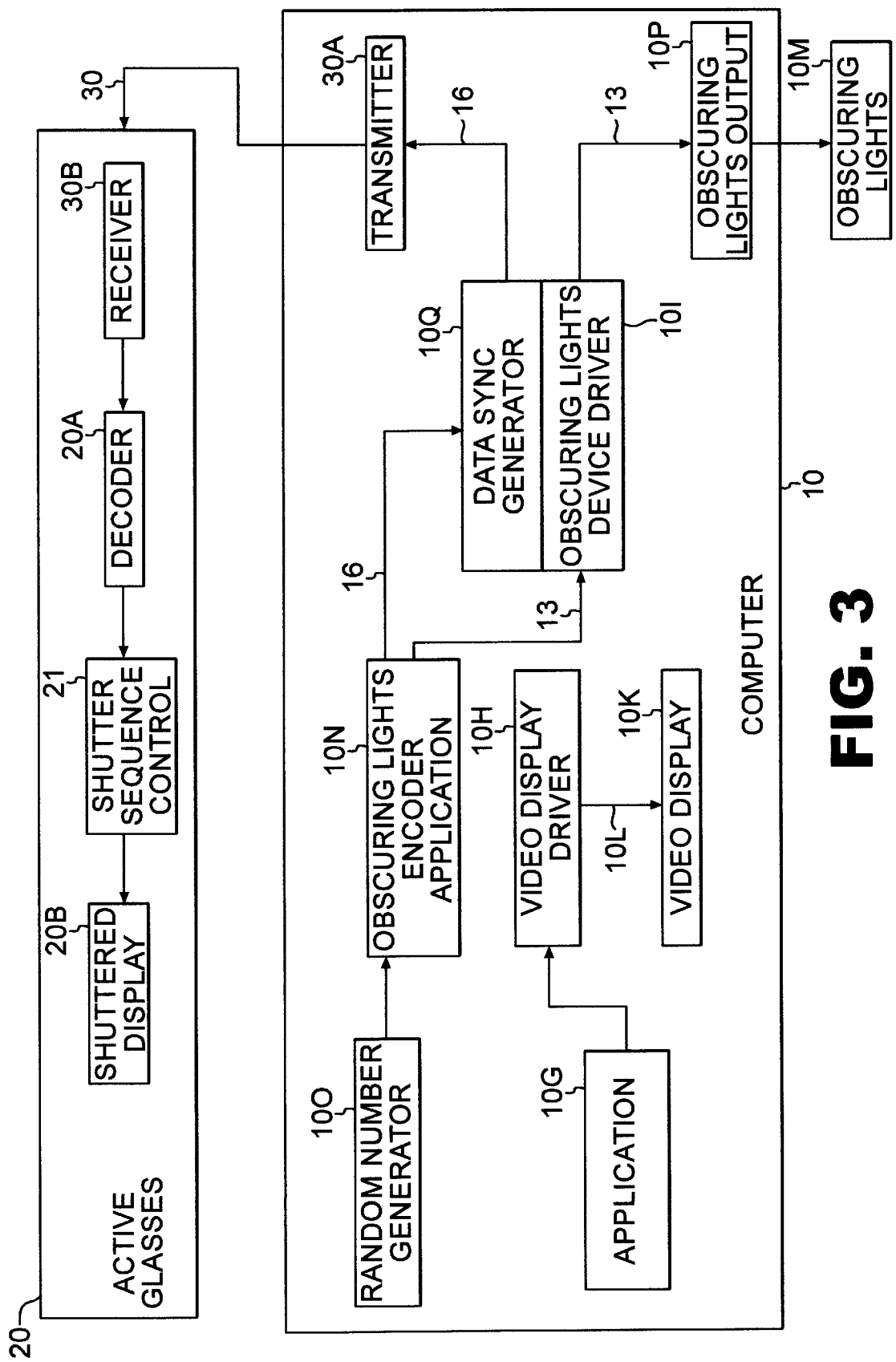
FIG. 3 is a schematic diagram illustrating the relationship between a computer and a pair of active glasses, both configured in accordance with the inventive arrangements.

The operation of the active glasses 20 in accordance with the inventive arrangements is shown diagramatically in FIG. 3. In the present invention, the active glasses 20 contain electro-optical elements typically found in active glasses, for example shutters in the shuttered display 20B. Specifically, a shutter sequence control 21 can control the sequencing of the shutters of the shuttered display 20B. In addition, as discussed above, the active glasses 20 can include a decoder 20A for decoding encoded sequencing data transmitted by the transmitter 30A of the computer 10 and received by the active glasses 20 in receiver 30B across data communications link 30.

Preferably, the shuttered display 20B can include individual shutters which can open and close as controlled by the shutter sequence control 21. Still, the invention is not limited in regard to the mechanism used by the shuttered display 20B in order to selectively inhibit and permit viewing through the shuttered display 20B. Specifically, instead of shutters the shuttered display 20B can include polarized lenses and the like. Notwithstanding, as referred to in this patent application, the term shutters should be understood to include both mechanical shutters and shutter equivalents such as polarized lenses.

In the present invention, the shutters of the active glasses 20 can be opened and closed in an alternating manner. The only variable, if any, associated with the opening and closing of the shutters is the sequencing rate. In a preferred embodiment of the present invention, in addition to sequencing rate considerations, the decoder 20A can be used to synchronize the shutters of the active glasses 20 to a specific sequence pattern. Subsequently, the shuttered display 20B can be driven in a pattern that matches the strobing of the obscuring lights 10M positioned proximate to the display 10K of the computer 10.

In operation, the obscuring lights 10M and the active glasses 20 are driven in synchronous operation by a specific pattern, creating in effect, a "strobe window" where a wearer of the active glasses 20 can view the display 10K while the obscuring lights 10M are in a deactivated state. Subsequently, the obscuring lights 10M can re-activate concurrently with which the active glasses 20 can inhibit the wearer's viewing of the display 10K and the activated obscuring lights. In this manner, the retina of an unauthorized observer not wearing the active glasses 20 synchronized with the obscuring lights 10M will become stimulated to an extent that the unauthorized viewer will be unable to comprehend private data 10L in the display 10K.

Significantly, because the active glasses 20 can be driven by a specific pattern, the present invention can include yet another layer of data security by incorporating 3D imaging techniques. Specifically, in addition to the obscuring lights 10M, the display 10K can also be linked to the obscuring lights encoder application 10N through a substitute video display driver 10P so that the display of private data 10L occurs only during the deactivation of the obscuring lights 10M and the opening of the shuttered display 20A. During the activation of the obscuring lights 10M and the closing of the shuttered display 20A, masking data, for example random data or a screen-saver, can be displayed.

Furthermore, using 3D imaging techniques, only a portion of each character or graphic in the display 10K can be displayed for one or the other of the user's eyes during any one cycle of the strobe window. At the next strobe, one or the other eye can be presented with another portion of the character or graphic. After several strobes, an entire character or graphic in the display will have been reproduced. The number of strobes required can be dependent on the number of portions, or sub-characters, per character used to develop an entire character on the display. During each strobe, data unrelated to the private data can be displayed in the display 10K so that non-authorized users can observe only public data. For example, a screen-saver pattern can be employed as the unrelated public data.

In order to synchronize the display 10K with the active glasses 20, the preferred embodiment can incorporate a sequencing pattern. The sequencing pattern can simply open or close the shuttered display 20B of the active glasses 20 and synchronously deactivate and activate the obscuring lights 10M. Significantly, the private data 10L in the display 10K can be unreadable to unauthorized user having active glasses 20, but lacking knowledge of the specific sequencing information.

In order to coordinate the specific sequencing of the obscuring lights 10M with the alternating action of the active glasses 20, an encoding application 10N can be employed. The encoding application 10N, which implements a sequencing pattern encoding algorithm, preferably incorporates a random number as a seed for the encoding algorithm. The encoding algorithm can set the obscuring lights device driver 101 and active glasses shutter sequence control 21 to a corresponding sequencing pattern. Notably, any popular encoding algorithm can be used in the sequencing pattern.

In order to properly synchronize the obscuring lights 10M and the active glasses 20 in a secure manner, a random cycle time between strobe cycles can be chosen and inserted into the synchronization signal. In order to encode a synchronization signal with a random cycle time, the encoder application 10N can obtain a seed from random number generator 100 in order to create a random cycle time for use in synchronizing the obscuring lights 10M and the active glasses 20. Specifically, as discussed in further detail herein, the seed can provide a foundation for delaying the deactivation of the obscuring lights 10M in a subsequent strobe cycle, in between which the obscuring lights 10M can remain activated.

The encoder application 10N can generate an obscuring lights sync signal 13 according to the sequencing pattern. Concurrently, the encoder application 10N can generate an active glasses sync signal 16 for synchronizing the active glasses 20 with the obscuring lights 10M. The obscuring lights device driver 101 can receive the obscuring lights sync signal 13 while a data sync generator 10Q can receive the active glasses sync signal 16. Initially, the obscuring lights device driver 101, using the data sync generator 10Q, can initialize the active glasses 20 by transmitting through transmitter 30A, an initialization sync signal (not shown) to the active glasses 20. Subsequently, the obscuring lights device driver 101 can pass the active glasses sync signal 16 to the active glasses 20 and the obscuring lights sync signal 13 to the obscuring lights 10M.

By synchronizing the action of the shuttered display 20B using the active glasses sync signal 16, the user can view only the portions of private data shown during the strobe (e.g. non-obscured) cycles. The visual persistence of the user's eyes can integrate the strobed portions of private data into a unified, privately viewed image, secure from viewing by unauthorized users. Hence, the active glasses 20 can provide an authorized user a private view of the private data 10L simultaneous to which an unauthorized viewer can see only the bursts of obscuring light which stimulate the retina of the unauthorized viewer's eyes so that the unauthorized viewer cannot discern the content of the display 10K.

Figure 4A:
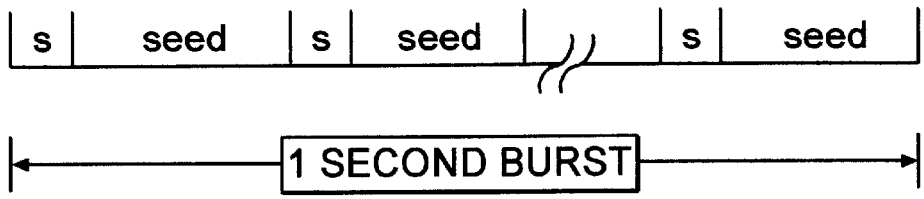
FIGS. 4A and 4B illustrate initialization synchronization and data transmission patterns used to synchronize the active glasses with a display of the computer.
Figure 4B:
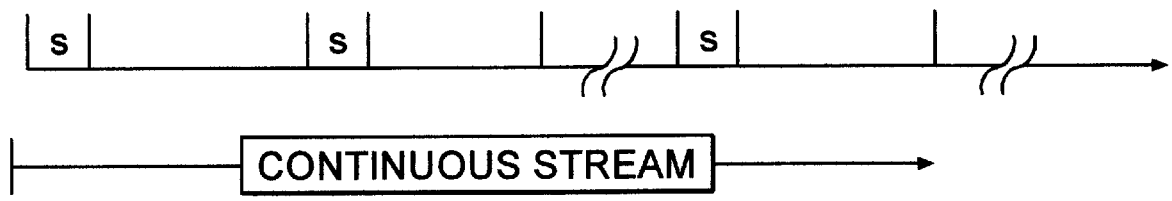

FIGS. 4A and 4B illustrate communications protocols which can be used for communications between the computer 10 and the active glasses 20. One skilled in the art will recognize however, that the protocols described herein are only exemplary of many protocols that could be equally and operatively employed. The important aspects of any protocol include the support for the initial synchronization of the obscuring lights 10M and active glasses 20 with the random seed, and the support for the transmission of the continuing synchronization between the obscuring lights 10M and the active glasses 20. Specifically, in the preferred embodiment, a user having a data communications link 30, preferably wireless, between the computer 10 and the active glasses 20 can turn away from the display 10K, lose a communications connection across the data communications link 30, turn back to the display 10K and regain the communications connection. In addition, the continuing synchronization can eliminate the need for the active glasses 20 to maintain an accurate timer during the sequencing operation.

As shown in FIGS. 4A and 4B, the preferred embodiment can include two protocols, an initialization protocol and a synchronization transmission protocol. As shown in FIG. 4A, the initialization protocol can initialize the active glasses 20 using the same seed used by the computer 10 to encode the shutter sequence in the active glasses sync signal 16. The active glasses 20 can be initialized by a short burst, preferably one second or less, that transmits a sync pattern for establishing communications between the computer 10 and the active glasses 20, and the seed pattern itself. Notably, as is well known in the art of data communications, the data sync pattern can be any pattern based on the error characteristics of the data communications link.

As shown in FIG. 4A, the initialization protocol preferably can be broadcast as a burst in order to prevent other proximate receivers from receiving and decoding the seed pattern. Still, the user preferably can add additional security by ensuring that no other active glasses in the area are being initialized at the same time. In the case of an infrared data communications link, the user can simply shield the transmitter and receiver path with the user's hand for the duration of the burst. Alternatively, in the case of an RF link, a serial number can be stored in a fixed memory in the active glasses 20. In consequence, the encoding application can use the serial number as part of the seed pattern so that only corresponding active glasses can decode the seed pattern.

FIG. 4B also illustrates a synchronization transmission protocol. The synchronization transmission protocol, like the initialization protocol, can include a broadcast of a transmission sync pattern. The transmission sync pattern may be the same or different than the initialization sync pattern. In fact, the transmission sync pattern can be eliminated if an encoding pattern, for example NRZ or NRZI, is used in the data communications link to denote timing data to be extracted by the active glasses. Still, since the transmission sync pattern is an encoded shutter synchronization pattern for the active glasses 20 to decode and apply, in incorporating a transmission sync pattern it is possible to further enhance security.

For example, notably each synchronization pattern can differ so the shutter sequence can be continuously varied. The decoder 20A residing on the active glasses 20 simply can apply the new synchronization pattern, decoded in each transmission sync frame. Further security can be incorporated by varying the durations of each transmission sync frame. As a result, in broadcasting several synchronization patterns of differing length between each transmission sync, the active glasses decoder 20A can still extract the synchronization pattern as a continuous stream of shutter actions.

Figure 5:
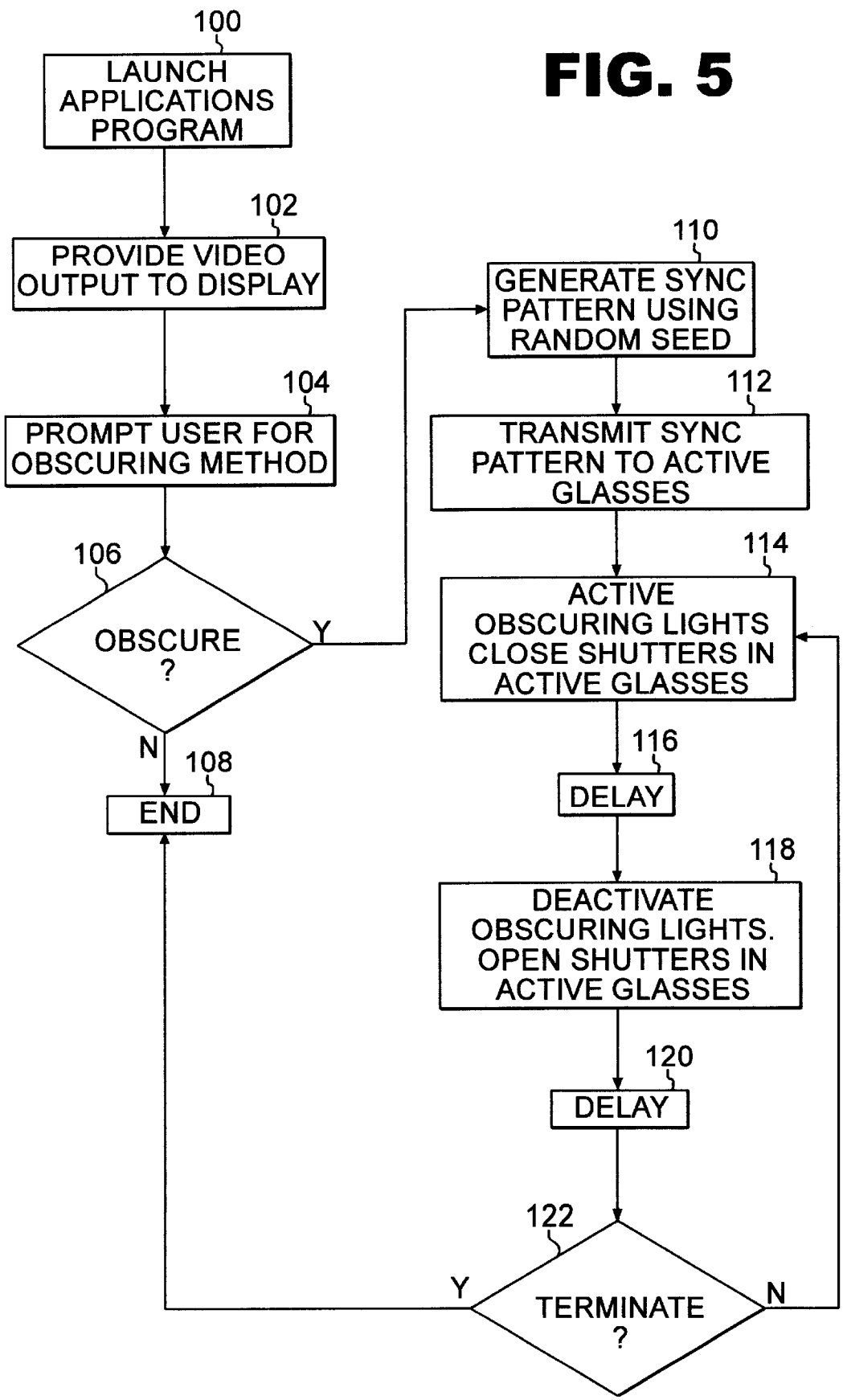
FIG. 5 is a flowchart illustrating an inventive method for providing privately viewable data in a publically viewable display.

FIG. 5 is a flow chart illustrating a method for providing privately viewable data in a publically viewable display. The method begins in step 100 during which an applications program residing in an applications layer of an operating system can be launched either automatically or manually by a user. In step 102, standard video output can be generated by the application and provided to the operating system for viewing on the display.

In step 104, the obscuring lights encoding application can prompt the user for an obscuring method which can include an encoded sequence or no sequence at all. If the user chooses not to obscure the video output, for instance where security is not of any particular concern, in step 108, the obscuring lights remain deactivated. If the user chooses obscure the video output by selecting an encoded sequence, for instance where security is of concern, in step 110, a seed pattern can be generated in order to determine a random cycle time for a synchronization pattern.

If the user has chosen an encoded sequence pattern, in step 112, the synchronization pattern, generated using the random seed, can be transmitted to the active glasses so as to synchronize the action of the shuttered lenses with the strobing of the obscuring lights. Subsequently, in step 114 the obscuring lights can be activated. Following the activation of the obscuring lights, a delay corresponding to the seed can be incurred in step 116. In step 118, the obscuring lights can be de-activated. Finally, in step 122, an additional delay subsequent to which the obscuring lights can be reactivated. The process can repeat until, in decision step 122, it is determined that the user no longer requires the display to be obscured by the obscuring lights.

In this way, the user having the synchronized active glasses will view only the private data in accordance with the alternating action of the shuttered display and will not view the bursts of light caused by the activation of the obscuring lights. Correspondingly, unauthorized viewers not having the synchronized active glasses will view only the bursts of obscuring light. Notably, to the unauthorized viewer, the private data will remain obscured by the obscuring lights.

What is claimed is:

1. A method for providing privately viewable data in a publicly viewable display comprising the steps of:

positioning obscuring lights proximate to said publicly viewable display;

generating a sequencing pattern;

generating a data signal, said data signal comprising private data frames;

providing said data signal to said publicly viewable display;

activating and deactivating obscuring lights according to said sequencing pattern; and, opening and closing a shuttered display in a set of active glasses in accordance with said sequencing pattern, whereby a user viewing said display with said active glasses can view said private data and unauthorized viewers without said active glasses can view only said private data obscured by said obscuring lights.

2. The method according to claim 1, wherein said sequencing pattern is encoded.

3. The method according to claim 1, wherein said step of activating and deactivating said obscuring lights comprises the steps of:

activating said obscuring lights; and, responsive to sync pulses in said sequencing pattern, deactivating and reactivating said obscuring lights.

4. The method according to claim 1, wherein said step of opening and closing said shuttered display comprises the steps of:

closing said shuttered display; and, responsive to sync pulses in said sequencing pattern, opening and closing said shuttered display.

5. The method according to claim 2, wherein said step of opening and closing said shuttered display comprises the steps of:

decoding said encoded sequencing pattern; and, responsive to sync pulses in said sequencing pattern, opening and closing said shuttered display.

6. The method according to claim 1, wherein said sequencing pattern corresponds to alternating displays of said private data and said private data masked by said obscuring lights.

7. The method according to claim 1, wherein said positioning step comprises the step of positioning strobe lights about the publicly viewable display.

8. The method according to claim 1, wherein said positioning step comprises the step of positioning fiber optic light pipes in said publicly viewable display.

9. The method according to claim 1, wherein said publicly viewable display is a laptop computer display panel.

10. The method according to claim 1, wherein said publicly viewable display is an ATM display screen.

11. The method according to claim 1, wherein said step of opening and closing said shuttered display comprises the step of opening and closing shutters in said shuttered display.

12. The method according to claim 1, wherein said step of opening and closing said shuttered display comprises the step of polarizing and depolarizing lenses in said shuttered display.

13. The method according to claim 1, wherein said generated data signal further comprises public data frames interspersed among said data frames in accordance with said sequencing pattern.

14. The method according to claim 13, wherein said private data frames comprise sets of private data portions, said portions combining to form said private data, wherein said portions are displayed sequentially according to said sequencing pattern.

15. A system for providing privately viewable data in a publicly viewable display comprising:

a computer comprising a display, a display driver, and at least one applications program;

a display obscuring system comprising an encoder and obscuring lights positioned proximate to said publicly viewable display;

an encoder algorithm disposed in said encoder for generating a sequencing pattern for driving said obscuring lights;

a pair of active glasses having a shuttered display; and, a data communications link communicatively linking said display obscuring system with said active glasses;

said at least one applications program providing private data in a data signal to said display driver;

said display driver providing said data signal to said publically viewable display;

said display obscuring system activating and deactivating said obscuring lights according to said sequencing pattern;

said active glasses receiving said sequencing pattern across said data communications link; and, said active glasses opening and closing said shuttered display in accordance with said sequencing pattern, whereby a user viewing said display with said active glasses can view said private data generated by said application, and unauthorized viewers without said active glasses can view only said private data masked by said obscuring lights.

16. The system according to claim 15, wherein said data communications link is a wireless data communications link.

17. The system according to claim 15, wherein said active glasses include a decoder for decoding said sequencing pattern.

18. The system according to claim 15, wherein said computer activates and deactivates said obscuring lights when indicated by sync pulses in said sequencing pattern.

19. The system according to claim 15, wherein said obscuring lights comprise fiber optic light pipes positioned in said display.

20. The system according to claim 15, wherein said obscuring lights comprise strobe lights positioned circumferentially about said display.

21. The system according to claim 17, wherein said decoder decodes said sequencing pattern; and, responsive to sync pulses in said sequencing pattern, opens and closes said shuttered display.

22. The system according to claim 15, wherein said sequencing pattern corresponds to alternating displays of said private data and said private data masked by said obscuring lights.

23. The system according to claim 15, wherein said data signal further comprises masking data interspersed among said private data according to said sequencing pattern.

24. The system according to claim 23, wherein said sequencing pattern corresponds to alternating displays of said private data and said private data masked by said masking data and said obscuring lights.

25. A machine readable storage, having stored thereon a computer program for providing privately viewable data in a publicly viewable display, said computer program having a plurality of code sections executable by a machine for causing the machine to perform the steps of:

generating a sequencing pattern;

generating a data signal, said data signal comprising private data frames;

providing said data signal to the publicly viewable display;

activating and deactivating obscuring lights positioned about the publicly viewable display according to said sequencing pattern; and, opening and closing a shuttered display in a set of active glasses in accordance with said sequencing pattern, whereby a user viewing said display with said active glasses can view said private data and unauthorized viewers without said active glasses can view only said private data obscured by said obscuring lights.

26. The machine readable storage according to claim 25, wherein said sequencing pattern is encoded.

27. The machine readable storage according to claim 25, wherein said step of activating and deactivating said obscuring lights comprises the steps of:

activating said obscuring lights; and, responsive to sync pulses in said sequencing pattern, deactivating and reactivating said obscuring lights.

28. The machine readable storage according to claim 25, wherein said step of opening and closing said shuttered display comprises the steps of:

closing said shuttered display; and, responsive to sync pulses in said sequencing pattern, opening and closing said shuttered display.

29. The machine readable storage according to claim 26, wherein said step of opening and closing said shuttered display comprises the steps of:

decoding said encoded sequencing pattern; and, responsive to sync pulses in said sequencing pattern, opening and closing said shuttered display.

30. The machine readable storage according to claim 25, wherein said sequencing pattern corresponds to alternating displays of said private data and said private data masked by said obscuring lights.

31. The machine readable storage according to claim 25, wherein said obscuring lights are strobe lights positioned circumferentially about the publicly viewable display.

32. The machine readable storage according to claim 25, wherein said obscuring lights are fiber optic light pipes positioned in said publicly viewable display.

33. The machine readable storage according to claim 25, wherein said publicly viewable display is a laptop computer display panel.

34. The machine readable storage according to claim 25, wherein said publicly viewable display is an ATM display screen.

35. The machine readable storage according to claim 25, wherein said step of opening and closing said shuttered display comprises the step of opening and closing shutters in said shuttered display.

36. The machine readable storage according to claim 25, wherein said step of opening and closing said shuttered display comprises the step of polarizing and depolarizing lenses in said shuttered display.

37. The machine readable storage according to claim 25, wherein said generated data signal further comprises public data frames interspersed among said data frames in accordance with said sequencing pattern.

38. The machine readable storage according to claim 37, wherein said private data frames comprise sets of private data portions, said portions combining to form said private data, wherein said portions are displayed sequentially according to said sequencing pattern.

* * * * *